UNITED STATES PATENT OFFICE.

WILLIAM T. GIBBS, OF BUCKINGHAM, QUEBEC, CANADA.

PROCESS OF MAKING CAUSTIC ALKALIES.

No. 910,662.  
Specification of Letters Patent.  
Patented Jan. 26, 1909.

Application filed March 10, 1906. Serial No. 305,331.

*To all whom it may concern:*

Be it known that I, WILLIAM TAYLOR GIBBS, a subject of the King of Great Britain and Canada, residing at Buckingham, Province of Quebec, county of Ottawa, Canada, have invented certain new and useful Improvements in Processes of Making Caustic Alkalies, fully described and represented in the following specification.

This invention relates to a new method of making caustic alkalies by decomposing or breaking up refractory silicates—such, for instance, as the feldspars, potash or lithia micas and the like, and recovering the alkalies contained therein.

I have discovered that by digesting the finely powdered silicate with a suitable alkaline earth hydrate under suitable pressure, the silicate may be decomposed, the alkalies going into solution in the water present as hydrates. The alkaline earth hydrate that I preferably use is milk of lime, but other alkaline earth hydrates such, for instance, as hydrated oxid of barium, strontium or magnesium, may be used. The best results in obtaining alkalies will be secured by using the lime or other alkaline earth in the proportion of two molecules of hydrated calcium or other oxid for every molecule of silica and one molecule for each molecule of alumina present in the silicate which it is desired to decompose, but these proportions may be varied.

In carrying out the process in practice, the silicates are pulverized so as to be treated in a finely divided state, then mixed with milk of lime or the other alkaline earth hydrate used, and digested under pressure, preferably steam pressure. I find a convenient steam pressure to be between 125 and 150 pounds per square inch above the atmosphere, but any pressure desired may be used, so long as it is high enough to secure such a digesting temperature as to cause the reaction to take place within a reasonable time. With the pressure stated, the reaction will be completed in from twelve to twenty-four hours, depending upon the character of the silicate under treatment, and the fineness to which the silicates are ground. For recovering the alkalies after decomposition of the silicates, the resulting sludge is filtered and the residual mud washed until free from alkali. The first filtrate and the subsequent washings are evaporated to any desired strength of caustic, or, by evaporating and fusing the residue, solid caustic alkali is obtained on cooling.

It will be seen that by this process the alkalies are obtained in their most valuable commercial form, that is, as hydrates, caustic potash being produced by treating potash feldspar, caustic soda by treating soda feldspar, and lithium hydrate by treating refractory silicates containing lithium, etc.

What I claim is:—

1. The process of making caustic alkalies, which consists in digesting finely divided refractory silicates containing alkalies with a solution of an alkaline earth hydrate under pressure.

2. The process of making caustic alkalies, which consists in digesting finely divided potash feldspar with milk of lime under steam pressure.

In testimony whereof, I have hereunto set my hand, in the presence of two subscribing witnesses.

WILLIAM T. GIBBS.

Witnesses:
  A. WHITE,
  C. J. SAWYER.